US009559823B2

(12) United States Patent
Ji et al.

(10) Patent No.: US 9,559,823 B2
(45) Date of Patent: *Jan. 31, 2017

(54) METHOD AND APPARATUS FOR ALLOCATING A CONTROL CHANNEL RESOURCE OF A RELAY NODE IN A BACKHAUL SUBFRAME

(71) Applicant: Samsung Electronics Co., Ltd., Gyeonggi-do (KR)

(72) Inventors: Hyoung Ju Ji, Seoul (KR); Joon Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 15 days.

This patent is subject to a terminal disclaimer.

(21) Appl. No.: 13/852,628

(22) Filed: Mar. 28, 2013

(65) Prior Publication Data
US 2013/0215819 A1 Aug. 22, 2013

Related U.S. Application Data

(63) Continuation of application No. 12/858,904, filed on Aug. 18, 2010, now Pat. No. 8,611,291.

(30) Foreign Application Priority Data

Aug. 18, 2009 (KR) ........................ 10-2009-0076423
Apr. 21, 2010 (KR) ........................ 10-2010-0036911

(51) Int. Cl.
*H04W 4/00* (2009.01)
*H04L 5/00* (2006.01)
(Continued)

(52) U.S. Cl.
CPC ......... *H04L 5/0053* (2013.01); *H04B 7/15542* (2013.01); *H04L 5/006* (2013.01);
(Continued)

(58) Field of Classification Search
CPC .... H04L 5/0053; H04L 5/006; H04B 7/15542; H04B 7/2606; H04W 72/0406; H04W 72/042; H04W 72/00; H04W 72/0426; H04W 84/047
See application file for complete search history.

(56) References Cited

U.S. PATENT DOCUMENTS 7,720,020 B2    5/2010  Larsson
7,885,230 B2 *  2/2011  Seo ...................... H04L 1/0071
                                                370/329
(Continued)

FOREIGN PATENT DOCUMENTS

CN    101083826    12/2007
CN    101159471    4/2008
(Continued)

OTHER PUBLICATIONS

Motorola: "Relay Backhaul Design", 3GPP TSG RAN WG1 Meeting #57bis, Jun. 29-Jul. 4, 2009.
(Continued)

*Primary Examiner* — Phuc Tran
(74) *Attorney, Agent, or Firm* — The Farrell Law Firm, P.C.

(57) ABSTRACT

A method and apparatus for allocating control channels of a relay is provided. The method includes generating resource block assignment information related to resource blocks allocated to the relay; transmitting resource information comprising the resource block assignment information; and transmitting a control channel according to the resource information.

12 Claims, 11 Drawing Sheets

(51) Int. Cl.
*H04W 72/04* (2009.01)
*H04B 7/155* (2006.01)
*H04W 84/04* (2009.01)
*H04B 7/26* (2006.01)
*H04W 72/00* (2009.01)

(52) U.S. Cl.
CPC ..... *H04W 72/042* (2013.01); *H04W 72/0406* (2013.01); *H04B 7/2606* (2013.01); *H04W 72/00* (2013.01); *H04W 72/0426* (2013.01); *H04W 84/047* (2013.01)

(56) References Cited

U.S. PATENT DOCUMENTS

| | | | |
|---|---|---|---|
| 7,894,388 B2 * | 2/2011 | Visotsky | 370/329 |
| 7,936,731 B2 * | 5/2011 | Park | H04L 1/1819 370/215 |
| 8,335,233 B2 * | 12/2012 | Ishii | H04W 72/1268 370/318 |
| 8,509,162 B2 * | 8/2013 | Horn et al. | 370/329 |
| 8,594,049 B2 * | 11/2013 | Ohta | 370/332 |
| 8,611,277 B2 * | 12/2013 | Krishnamurthy | H04J 11/0056 370/328 |
| 8,705,655 B2 * | 4/2014 | Hariharan | H04L 1/08 375/299 |
| 8,787,240 B2 * | 7/2014 | Liu et al. | 370/315 |
| 2007/0081483 A1 | 4/2007 | Jang et al. | |
| 2007/0081507 A1 | 4/2007 | Koo et al. | |
| 2007/0211662 A1 | 9/2007 | Hyon et al. | |
| 2007/0217367 A1 * | 9/2007 | Lee et al. | 370/335 |
| 2008/0013520 A1 * | 1/2008 | Liu et al. | 370/347 |
| 2008/0253484 A1 * | 10/2008 | Kakura et al. | 375/343 |
| 2008/0310535 A1 * | 12/2008 | Kwon | H04L 5/0044 375/260 |
| 2008/0317146 A1 * | 12/2008 | Kwon | H04L 1/0071 375/260 |
| 2009/0073915 A1 | 3/2009 | Zhang et al. | |
| 2009/0116419 A1 | 5/2009 | Chong et al. | |
| 2009/0310476 A1 * | 12/2009 | Seo | H04B 7/12 370/203 |
| 2010/0015914 A1 | 1/2010 | Li et al. | |
| 2010/0120442 A1 | 5/2010 | Zhuang et al. | |
| 2010/0157826 A1 | 6/2010 | Yu et al. | |
| 2010/0177697 A1 | 7/2010 | Tanno | |
| 2010/0214972 A1 | 8/2010 | Che | |
| 2010/0226305 A1 | 9/2010 | Jang | |
| 2010/0246499 A1 * | 9/2010 | Kim et al. | 370/329 |
| 2010/0260095 A1 | 10/2010 | Youn et al. | |
| 2010/0312894 A1 * | 12/2010 | Awad | H04L 5/0007 709/226 |
| 2010/0322136 A1 * | 12/2010 | Kanazawa et al. | 370/312 |
| 2010/0323693 A1 * | 12/2010 | Krishnamurthy | H04J 11/0056 455/434 |
| 2011/0021203 A1 | 1/2011 | Yamada | |
| 2011/0051681 A1 | 3/2011 | Ahn | |
| 2011/0053625 A1 * | 3/2011 | Ishii | H04L 1/1812 455/507 |
| 2011/0110357 A1 | 5/2011 | Chung | |

FOREIGN PATENT DOCUMENTS

| | | |
|---|---|---|
| EP | 1 855 492 | 11/2007 |
| JP | 2008-047993 | 2/2008 |
| JP | 2009-232464 | 10/2009 |
| KR | 1020070038875 | 4/2007 |
| RU | 2006 110 565 | 7/2004 |
| RU | 2337484 | 10/2008 |
| WO | WO 2007/124688 | 11/2007 |
| WO | WO 2009/017365 | 2/2009 |
| WO | WO 2010/056485 | 5/2010 |

OTHER PUBLICATIONS

LG Electronics: "Resource Allocation and Downlink Control Channel Structure for Relay Backhaul Link", 3GPP TSG RAN WG1 Meeting #57, May 4-8, 2009.
3rd Generation Partnership Project; Technical Specification Group Radio Access Network; Feasibility Study for Further Advancements for E-UTRA (LTE-Advanced) (Release 9), 3GPP TR 36.912 V2.0.0, Aug. 2009.
Motorola, "Relay Backhaul Design", R1-092638, 3GPP TSG RAN WG1 Meeting #57bis, Jun. 29-Jul. 4, 2009.
LG Electronics: "Resource Allocation and Downlink Control Channel Structure for Relay Backhaul Link", R1-091194, 3GPP TSG RAN WG1 Meeting #56bis, Mar. 23-27, 2009.
Research in Motion, UK Limited, "Relay Link Control Signalling", R1-091151, 3GPP TSG RAN WG1 Meeting #56bis, Mar. 23-27, 2009.
U.S. Office Action dated Dec. 15, 2015 issued in counterpart U.S. Appl. No. 14/858,714, 17 pages.
Catt et al., "Draft Text Proposal on Type 1 Relay UL Backhaul Subframes in LTE-A", R1-092780, 3GPP TSG RAN WG1 #57-bis, Jun. 29-Jul. 3, 2009, 1 page.
Samsung, "Some Considerations on Downlink Backhaul Control Design in Type I Relay", R1-092660, 3GPP TSG WG1 Meeting #57bis, Jun. 29-Jul. 3, 2009, 5 pages.
Nortel, "Discussion Paper on the Control Channel and Data Channel Optimization for Relay Link", R1-091384, 3GPP TSG-RAN WG1 Meeting #56bis, Mar. 23-27, 2009, 9 pages.
Korean Office Action dated Feb. 15, 2016 issued in counterpart application No. 10-2010-0036911, 8 pages.
Japanese Office Action dated Feb. 22, 2016 issued in counterpart application No. 2015-107272, 7 pages.
Samsung, "DL Backhaul Physical Channel Design for Type I Relay", 3GPP TSG RAN WG1 Meeting #58, Aug. 24-Aug. 28, 2009.
Email Discussion Rapporteur, "Summary of Relay Email Discussion (59-12-LTE-A): R-PDCCH", R1-100380, 3GPP TSG RAN WG1 Meeting #59bis, Jan. 18-22, 2010.
Russian Office Action dated Mar. 25, 2015 issued in counterpart application No. 2012105803/07.
Japanese Office Action dated Jan. 6, 2015 issued in counterpart application No. 2014-066627.

* cited by examiner

FIG. 1
(PRIOR ART)
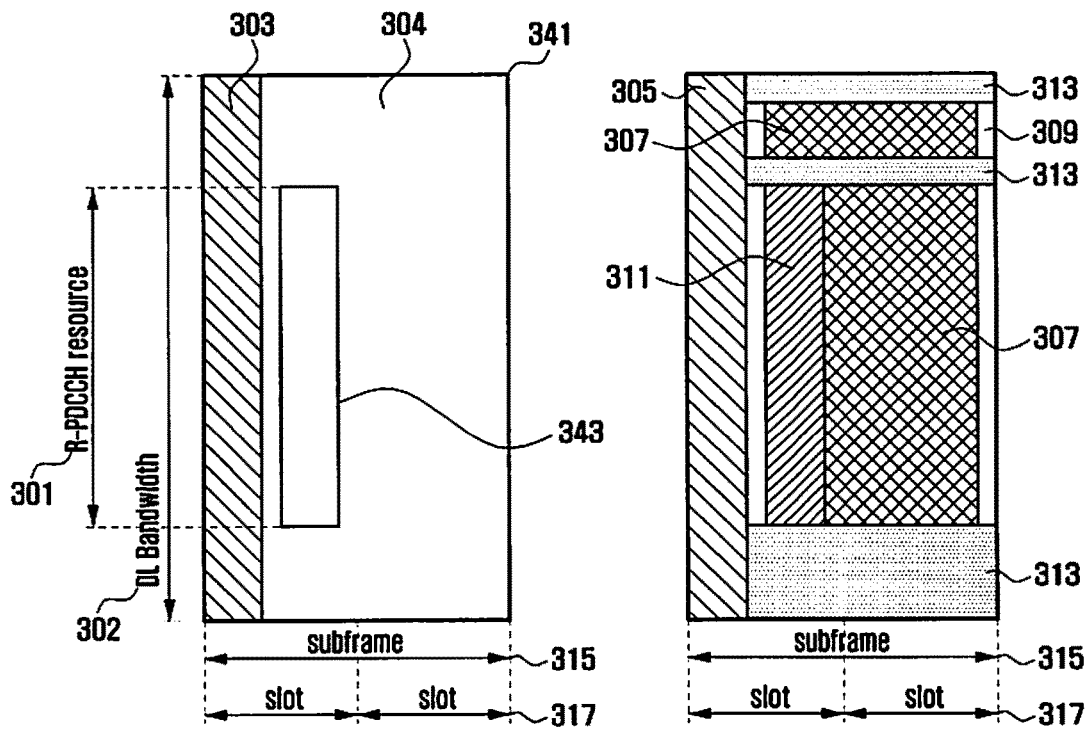
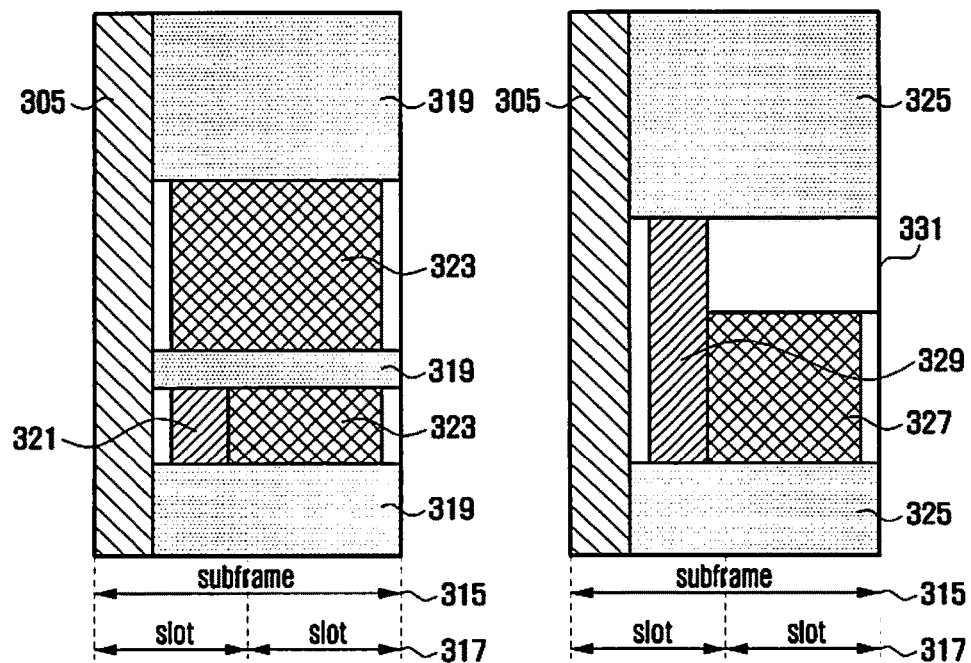

METHOD AND APPARATUS FOR ALLOCATING A CONTROL CHANNEL RESOURCE OF A RELAY NODE IN A BACKHAUL SUBFRAME

PRIORITY

This application is a Continuation Application of U.S. patent application Ser. No. 12/858,904, which was filed in the U.S. Patent and Trademark Office on Aug. 18, 2010, and claims priority to Korean Patent Application Nos. 10-2009-0076423, filed on Aug. 18, 2009, and 10-2010-0036911, filed on Apr. 21, 2010 in the Korean Intellectual Property Office, the disclosure of each which is incorporated herein in its entirety by reference.

BACKGROUND OF THE INVENTION

1. Field of the Invention

The present invention generally relates to wireless communications and, in particular, to a method and apparatus for allocating a control channel of a relay node within a backhaul subframe in a wireless communication system.

2. Description of the Related Art

Orthogonal Frequency Division Multiplexing (OFDM) is a multicarrier modulation technique in which a serial input symbol stream is converted into parallel symbol streams and modulated into mutually orthogonal subcarriers, i.e., a plurality of subcarrier channels.

The multicarrier modulation-based system was first applied to military high-frequency radios in the late 1950s, and the OFDM scheme, which overlaps multiple orthogonal subcarriers, has been developing since 1970s. But there were limitations on its application to actual systems due to the difficulty in realization of orthogonal modulation between multiple carriers. However, the OFDM scheme has undergone rapid development since Weinstein et al. presented in 1971 that OFDM-based modulation/demodulation can be efficiently processed using DFT (Discrete Fourier Transform). In addition, as a scheme that uses a guard interval and inserts a Cyclic Prefix (CP) symbol into the guard interval, the negative influence of the system on multiple paths and delay spread has been reduced significantly.

Owing to such technical developments, OFDM technology is being widely applied to digital transmission technologies such as Digital Audio Broadcasting (DAB), Digital Video Broadcasting (DVB), Wireless Local Area Network (WLAN), Wireless Asynchronous Transfer Mode (WATM), etc. That is, the OFDM scheme could not be widely used before due to its high hardware complexity, but the development of various digital signal processing technologies including Fast Fourier Transform (FFT) and Inverse Fast Fourier Transform (IFFT) has facilitated its realization.

In the meantime, an LTE-A system can include relay nodes as well as base stations (evolved Node B, eNodeB, or eNB) and mobile stations (User Equipment, or UE). A base station can allocate transmission resources for the backhaul link between the base station and the relay node and the resources allocated for the backhaul link are referred to as backhaul subframes.

FIGS. 1 and 2 are diagrams illustrating a principle for configuring a backhaul subframe for the relay nodes in an LTE-A system.

Referring to FIGS. 1 and 2, reference number 343 denotes a region in which the control channel of a relay node is transmitted. The region 343 is a resource informed by higher layer signaling. The allocated resource amount, i.e. the size of Resource Block (RB) 401, is semi-static, and the RB used in actual transmission may change in every backhaul subframe.

In the case where the control channel of the relay node is transmitted in the allocated control region by imitating the control channel structure of an LTE system, the resource amount for transmission is less than (but not equal to) the allocated resource and, as a consequence, a blank area, as denoted by reference number 331, in which no transmission occurs is distributed across the entire control channel, resulting in waste of resource. Although, in the case where the resource is allocated semi-statically, the region allocated for the relay node varies every subframe, the resource is not easily changed in size and is indicated fixedly, such that it is difficult to allocate resources in a frequency selective manner. The frequency selective resource allocation can be performed for the data channel for transmission to other terminals within the cell as well as the relay resource. In the case where the relay resource region is pre-configured in a large size for this, the relay must perform a plurality of blind decodings, resulting in an increase of relay implementation complexity. In order to perform the frequency selective resource allocation, the relay node must inform a large amount of the semi-static resource 415, resulting in increase in the number of blind decodings. In the case where the large amount of the semi-static resource is informed, the number of unnecessary blind decodings also increases especially when a small transmission resource is allocated, resulting in degradation of efficiency.

SUMMARY OF THE INVENTION

In order to solve the problems of the prior art, the present invention provides a method and apparatus for allocating control channel resources for a relay node within a backhaul subframe in a wireless communication system that is capable of dividing a resource region for the transmission of the relay node into multiple resource groups and allocating the resources of the same resource group to the relay nodes in the same transmission mode so as to reduce the number of blind decodings.

Also, the present invention provides a method and apparatus for allocating control channel resources for a relay node within a backhaul subframe in a wireless communication system that is capable of reducing the number of blind decodings at the relay node and maximizing frequency diversity gain and frequency selective gain between resource groups.

Also, the present invention provides a method and apparatus for allocating control channel resources for a relay node within a backhaul subframe in a wireless communication system that is capable of supporting both the resource groups in which interleaving is performed among the control channels and the resource groups in which no interleaving is performed.

BRIEF DESCRIPTION OF THE DRAWINGS

The above and other objects, features and advantages of the present invention will be more apparent from the following detailed description in conjunction with the accompanying drawings, in which:

FIGS. 1 and 2 are diagrams illustrating a principle for configuring a backhaul subframe for the relay nodes in an LTE-A system;

DETAILED DESCRIPTION OF EMBODIMENTS OF THE PRESENT INVENTION

Figure 2:
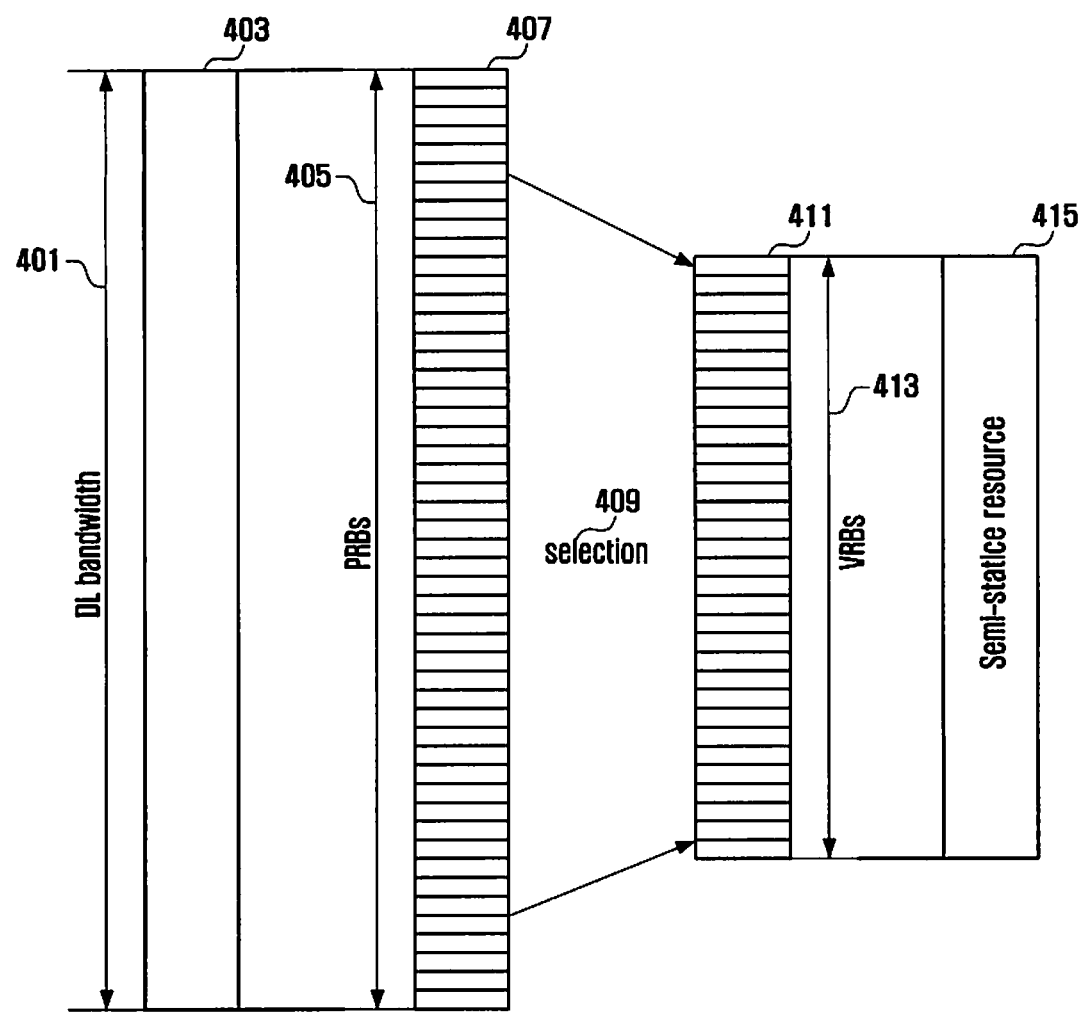

Embodiments of the present invention are described in detail with reference to the accompanying drawings. The same reference numbers are used throughout the drawings to refer to the same or like parts. Detailed description of well-known functions and structures incorporated herein may be omitted to avoid obscuring the subject matter of the present invention.

Terms and words used in the specification and claims must be regarded as concepts selected as the best method of illustrating the present invention, and must be interpreted as having meanings and concepts adapted to the scope and spirit of the present invention to understand the technology of the present invention. Therefore, the embodiments described in the specification and the constructions illustrated in the drawings do not represent all of the technical spirit of the present invention. Accordingly, it should be understood that various equivalents and modifications can be substituted.

In the following, the channel and resource dedicated to a relay node are referred to as R-channel and R-resource.

Although the following description is directed to LTE and LTE-A systems, the present invention can be applied to other types of wireless communication systems in which the base station performs scheduling.

OFDM, though it is similar to the conventional Frequency Division Multiplexing (FDM), can obtain optimal transmission efficiency during high-speed data transmission by maintaining orthogonality between multiple tones. In addition, the OFDM scheme can obtain optimal transmission efficiency during high-speed data transmission as it has high frequency utilization efficiency and is robust against multipath fading.

Since OFDM overlaps the frequency spectra of the subcarriers, it has high frequency utilization efficiency, is robust against frequency selective fading, can reduce an Inter-Symbol Interference (ISI) effect with the use of a guard interval, can design simple hardware of an equalizer, and is robust against impulse noises. Therefore, the OFDM scheme is used for various communication systems.

In wireless communications, high-speed, high-quality data services are generally hindered by the channel environments. In wireless communications, the channel environments suffer from frequent changes not only due to Additive White Gaussian Noise (AWGN) but also power variation of received signals, caused by a fading phenomenon, shadowing, a Doppler effect brought on by movement of a terminal and a frequent change in a velocity of the terminal, interference by other users or multipath signals, etc. Therefore, in order to support high-speed, high-quality data services in wireless communication, there is a need to efficiently overcome the above factors.

In OFDM, modulation signals are located in the two-dimensional time-frequency resources. Resources on the time domain are divided into different OFDM symbols, and are orthogonal with each other. Resources on the frequency domain are divided into different tones, and are also orthogonal with each other. That is, the OFDM scheme defines one minimum unit resource by designating a particular OFDM symbol on the time domain and a particular tone on the frequency domain, and the unit resource is called a Resource Element (RE). Since different REs are orthogonal with each other, signals transmitted on different REs can be received without causing interference with each other.

A physical channel is a channel defined on the physical layer for transmitting modulation symbols obtained by modulating one or more coded bit sequences. In an Orthogonal Frequency Division Multiple Access (OFDMA) system, a plurality of physical channels can be transmitted depending on the usage of the information sequence or receiver. The transmitter and receiver negotiate the RE on which a physical channel is transmitted, and this process is called mapping.

The LTE system is a communication system that uses OFDM in the downlink, and Single Carrier-Frequency Division Multiple Access (SC-FDMA) in the uplink. The LTE-A system is an advanced LTE system supporting wider bandwidth by aggregating two or more LTE component carriers.

Figure 3:
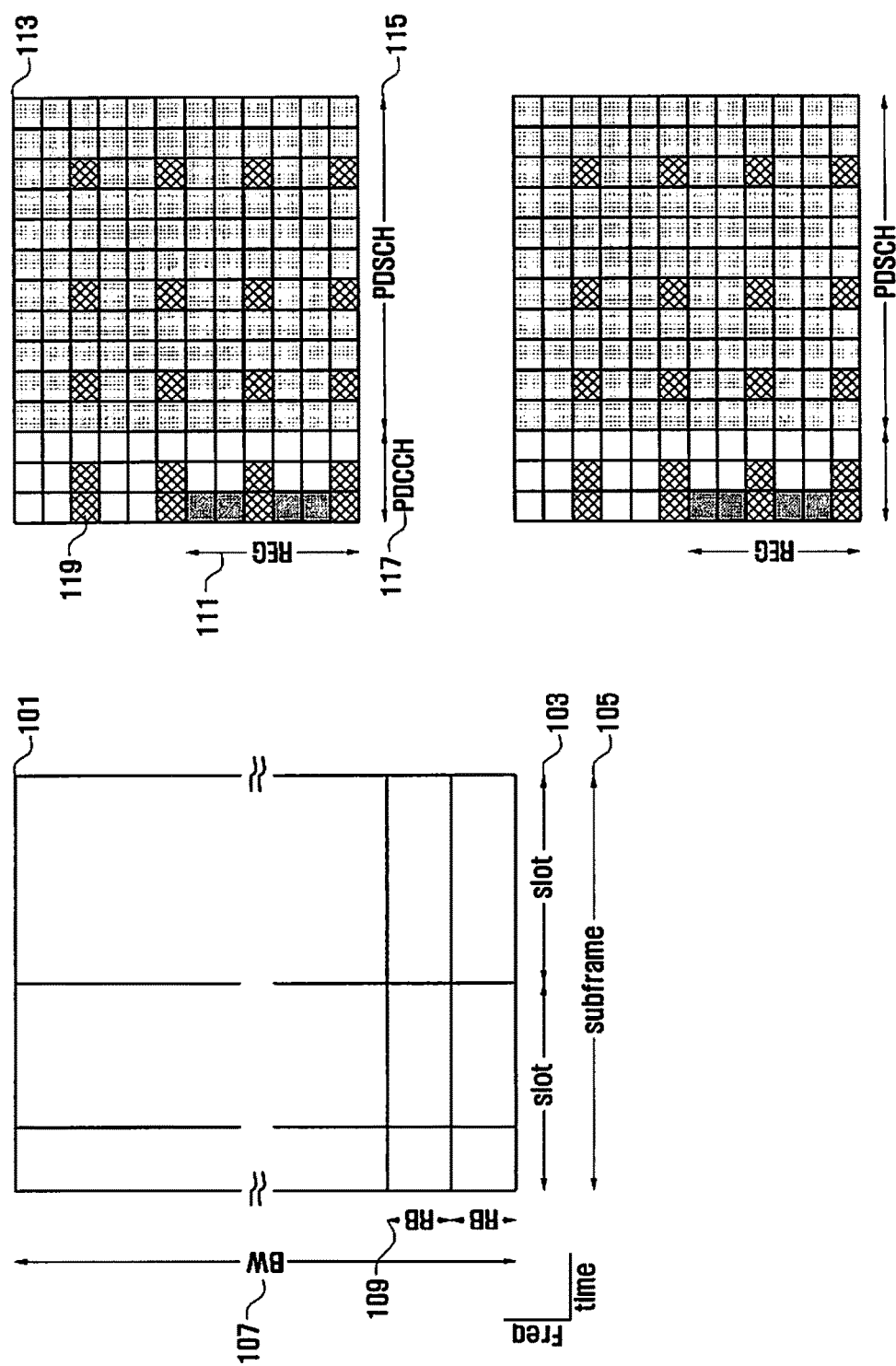
FIG. 3 is a diagram illustrating a structure of a subframe for use in a Long Term Evolution (LTE) system to which the present invention is applied.

FIG. 3 is a diagram illustrating a structure of a subframe for use in a Long Term Evolution (LTE) system to which the present invention is applied.

Referring to FIG. 3, resources are composed of a plurality of Resource Blocks (RB) in the LTE bandwidth, and an RB 109 (or 113) is defined as 12 tones in the frequency domain and 14 or 12 OFDM symbols in the time domain and is a basic unit of resource allocation. A subframe 105 is 1 ms long and consists of two consecutive timeslots 103. The subframe consisting of 14 OFDM symbols is referred to as a normal Cyclic Prefix (CP) subframe and the subframe consisting of 12 OFDM symbols is referred to as an extended CP subframe.

The Reference Signals (RS) 119 are signals negotiated between the mobile terminal and the base station for the mobile terminal to estimate the channel. The RS 119 can carry the information on the number of antenna ports, e.g., 0, 1, 2, and 3. In the case where the number of antenna ports is greater than 1, multiple antennas are used. Although the absolute position of the RE for the RS 119 in the frequency domain varies depending on the cell, the interval between the RSs 119 is maintained regularly. That is, the RS 119 of the same antenna port maintains a distance of 6 REs, and the reason why the absolute position of the RS 119 varies is to avoid collision of the RSs of different cells.

Meanwhile, the control region is located in the beginning of the subframe. In FIG. 3, reference number 117 denotes the control region (i.e., PDCCH). The control region can be configured across L OFDM symbols in the beginning of a subframe. Here, L can have a value of 1, 2, or 3. In the case where the amount of the control information is small such that one OFDM symbol is enough for transmitting the control information, only one OFDM symbol in the beginning of the subframe is used to transmit the control information (L=1), and the remaining 13 OFDM symbols are used to transmit data. The value L is used as the basic information for demapping at the receiver and thus, if it is not received, the receiver cannot recover the control channel. In Multimedia Broadcast over a Single Frequency Network (MBSFN), the value of L is 2. Here, the MBSFN is a channel for transmitting broadcast information. If the subframe indicates the broadcast information, the LTE terminal receives in the control region but not in the data region of the subframe.

The reason why the control signaling is transmitted in the beginning of the subframe is for the terminal to determine whether the subframe is intended for itself and, as a consequence, to determine whether to receive the data channel (i.e., the Physical Downlink Shared CHannel (PDSCH)). If it is determined that there is no data channel destined to the terminal, the terminal can enter an idle mode and save power.

The LTE standard specifies three downlink control channels: Physical Control Format Indicator CHannel (PCFICH), Physical Hybrid ARQ Indicator CHannel (PHICH), and Packet Data Control CHannel (PDCCH); and these control channels are transmitted in units of Resource Element Group (REG) 111 within the control region 117.

The PCFICH is the physical channel for transmitting the Control Channel Format Indicator (CCFI) to the terminal. CCFI is 2-bits long and indicates the number of symbols occupying the control region in a subframe "L". Since a terminal can recognize the number of symbols of the control region based on the CCFI, the PCFICH must be the first channel to be received in a subframe except when the downlink resource is allocated persistently. Since it is impossible to know the value of L before receiving the PCFICH, the PCFICH is always mapped to the first OFDM symbol of each subframe. The PCFICH is in 4 resource groups formed by equally separating 16 subcarriers in frequency.

The PHICH is the physical channel for transmitting downlink ACK/NACKs. PHICH is received by the terminal that is transmitting data in the uplink. Accordingly, the number of PHICHs is in proportion to the number of terminals that are transmitting in the uplink. PHICH is transmitted in the first OFDM symbol ($L_{PHICH}=1$) or three OFDM symbols ($L_{PHICH}=3$) of the control region. The PHICH configuration information (number of channel, $L_{PHICH}$) is broadcast through the Primary Broadcast Channel (PBCH) such that all of the terminals acquire the information at their initial connection to the cell. Also, PHICH is transmitted at a predetermined position per cell like the PCFICH such that the terminals can acquire the PHICH configuration information by receiving the PBCH when the terminal connects to the cell regardless of other control channel information.

The PDCCH 117 is the physical channel for transmitting data channel allocation information or power control information. The PDCCH can be transmitted with different channel coding rates according to the channel condition of the target terminal. Since Quadrature Phase Shift Keying (QPSK) is always used for PDCCH transmissions, changing the channel coding rate requires change of the resource amount for a PDCCH. When the channel condition of the terminal is good, a high channel coding rate is used to save the resource. In contrast, when the channel condition of the terminal is bad, a low channel coding rate is used to increase reception probability at the terminal even at the cost of large amounts of resources. The resource amount for each PDCCH is determined in unit of Control Channel Element (CCE). Each CCE is composed of 5 Resource Element Groups (REG) 111. In order to secure diversity, the REGs of the PDCCH are arranged in the control region after interleaving has been performed.

In order to multiplex several ACK/NACK signals, a Code Division Multiplexing (CDM) technique is applied for the PHICH. In a single REG 111, 8 PHICH signals are multiplexed into 4 real number parts and 4 imaginary number parts by means of the CDM technique and repeated as many as $N_{PHICH}$ so as to be distributed in the frequency domain to obtain frequency diversity gain. By using $N_{PHICH}$ REG 111, it is possible to form the 8 or less PHICH signals. In order to form more than 8 PHICH, it is necessary to use other $N_{PHICH}$ REG 111.

After assigning resources for the PCFICH and PHICH, a scheduler determines the value of L, maps the physical channels to the REG 111 of the assigned control region 117 based on the value of L, and performs interleaving to obtain frequency diversity gain. The interleaving is performed on the total REG 111 of the subframe 105 determined by the value of L in units of REG in the control region 117. The output of the interleaver in the control region 117 is capable of preventing Inter-Cell Interference (ICI) caused by using the same interleaver for the cells and obtaining the diversity gain by distributing the REGs 111 of the control region 117 across one or more symbols. Also, it is guaranteed that the REGs 111 forming the same control channel are distributed uniformly across the symbols per control channel.

Recently, research has been conducted on the LTE-A system as an advanced LTE system. Particularly, the research has been focused on the extension of the coverage with relays that remove shadow areas in the cell and wireless backhaul for connecting the base stations with the relay that operates in the same manner as the base station.

Figure 4:
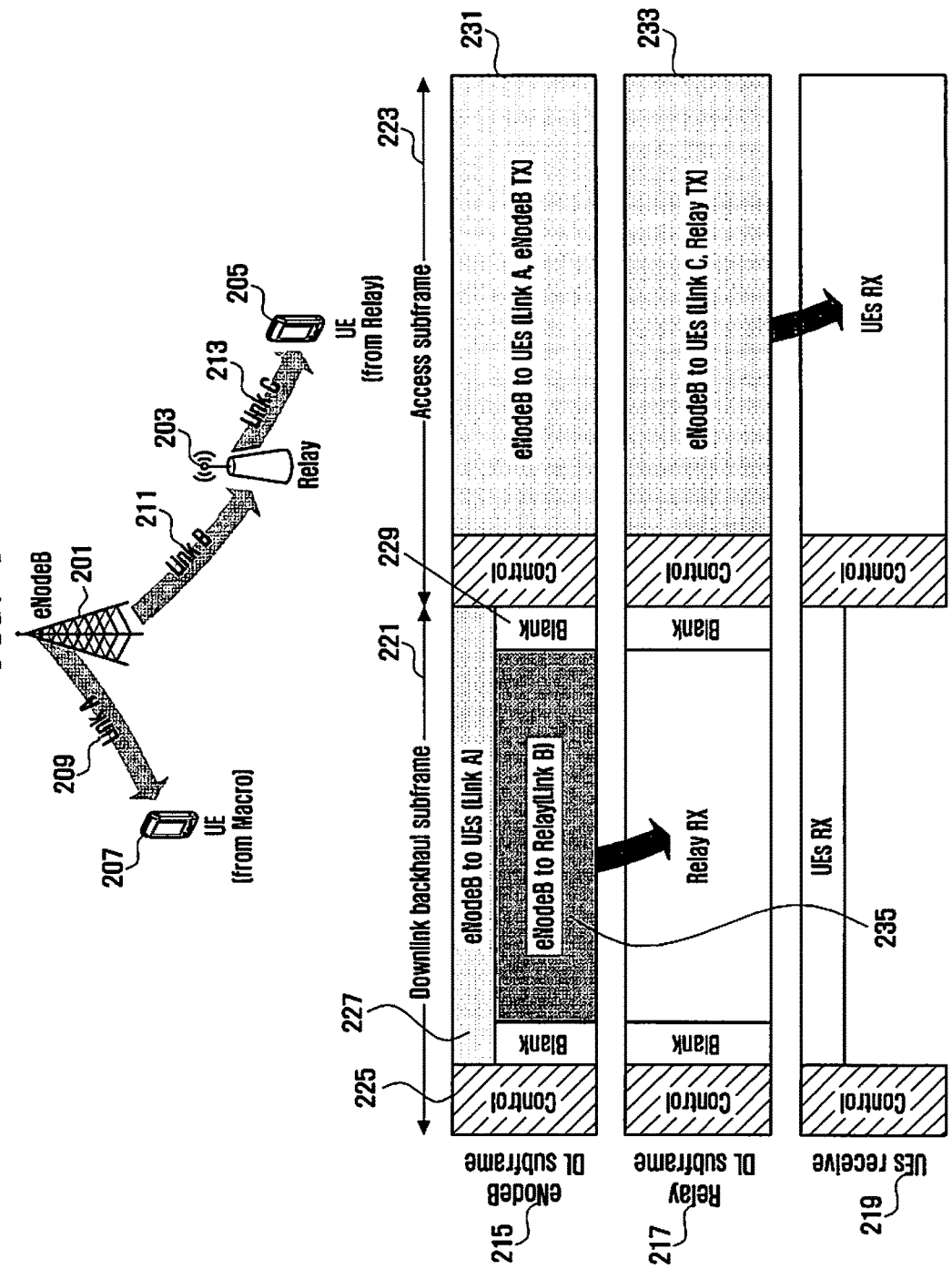
FIG. 4 is a diagram illustrating an operation principle of a relay in an LTE-A system according to an embodiment of the present invention.

FIG. 4 is a diagram illustrating an operation principle of a relay in an LTE-A system according to an embodiment of the present invention.

Referring to FIG. 4, the relay 203 receives data transmitted from the base station 201 and forwards the data to the terminal 205. There can be multiple communication links in the cell having a relay node.

The base station 201 and the terminal 207 are connected through a link A 209, and the relay node 203 and the terminal 205 are connected through a link C 213. Since the relay node 203 is regarded as a base station in view of the terminal 205, the link A 209 and link C 213 can be considered as in the same transmission region as denoted by reference number 219.

The base station 201 and the relay 203 are connected through a link B 211, and the link B 211 is used to transmit the data destined to the terminal 205 connected to the relay 203 or exchange higher layer signaling between the base station 201 and the relay 203.

Reference numbers 215 and 217 denote the subframes carrying the data transmitted from the base station 201 to the terminal 205 via relay 203. The subframes denoted by reference number 215 show the region in which the base station 201 transmits data to the relay 203 and the terminal 207, and the frames denoted by reference number 217 show the region in which the relay node 203 transmits data to the terminal 205 or receives data from the base station 201. The subframes denoted by reference number 219 show the region in which the terminal 207 connected to the base station 201, or the terminal 205 connected to the relay 203, receives data from the base station 201 or the relay 203, respectively.

Reference number 221 denotes a backhaul subframe transmitted on the backhaul link. The backhaul subframe can be used to carry data transmitted to the relay node 203 and the terminal 207 connected to the base station 201 or dedicated to backhaul data transmission.

Reference number 235 denotes a resource region allocated for the backhaul transmission. The base station 201 transmits the control channel 225 in every subframe, and the relay 203 also transmits the control channel in the same manner. The relay 203 cannot transmit and receive data simultaneously. Accordingly, when the relay 203 transmits the control channel, it cannot receive the control channel information transmit by the base station 201. The base station 201 transmits the data to the relay 203 in the region 235 of the backhaul subframe after the transmission of the control channel such that the relay 203 receives the information of the corresponding region. After the transmission in the data channel region 235, it is necessary to switch from transmission to reception. Accordingly, a blank region 229 is required.

A description is now made of the method for a base station to allocate resources to a relay in a broadband wireless communication system.

First Embodiment

Figure 5:
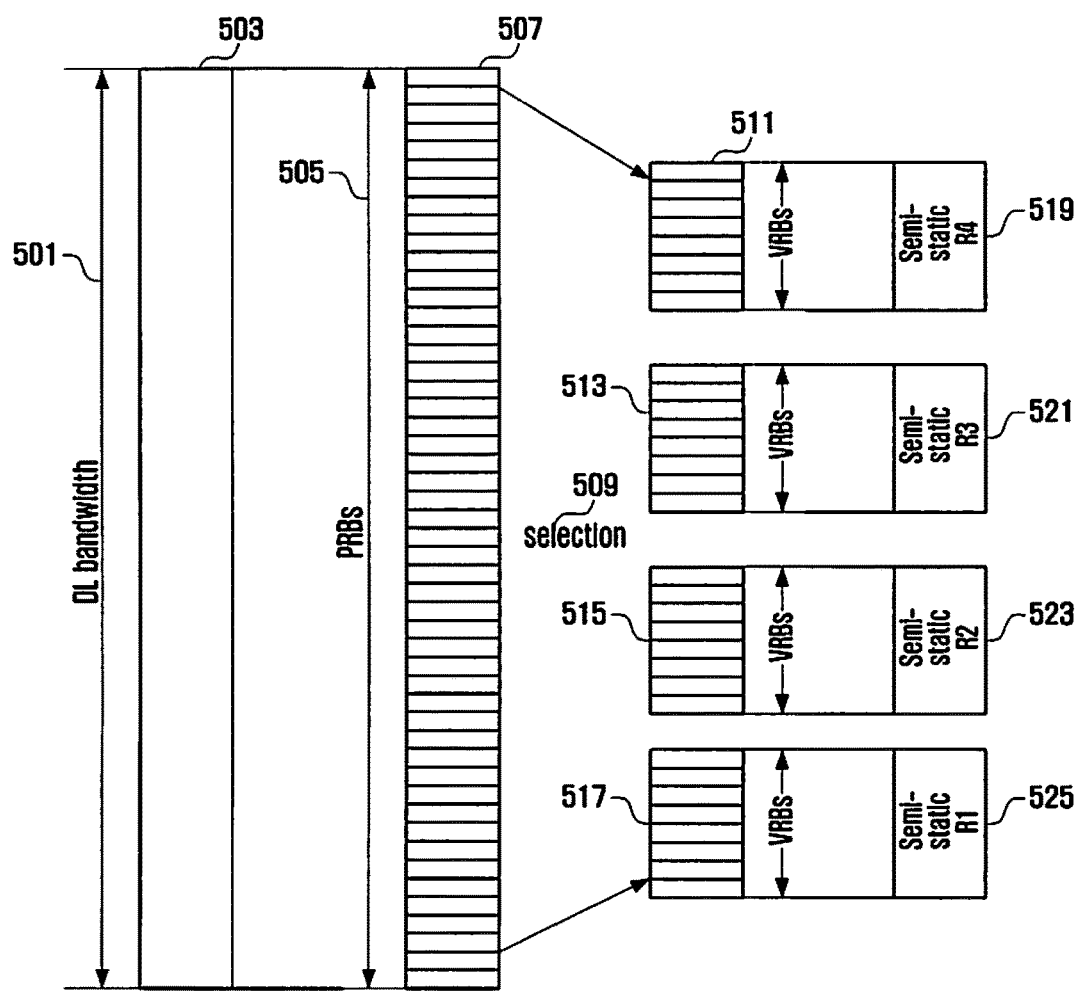
FIG. 5 is a diagram illustrating a principle of allocating control channel resources of a relay in a wireless communication system according to a first embodiment of the present invention.

FIG. 5 is a diagram illustrating a principle of allocating control channel resources of a relay in a wireless communication system according to a first embodiment of the present invention.

In this embodiment, when allocating the backhaul subframe control channel resources of the relay, the base station divides the resource region for the relay into a plurality of resource groups and allocates the same resource group to relays operating in the same transmission mode so as to reduce the number of blind decoding attempts. At this time, the base station allocates resources to the relay in advance and informs the relay of the currently used resource group and transmission mode so as to reduce the number of blind decoding attempts and maximize the frequency diversity gain and frequency selective gain among the groups. Also, the base station supports the group in which interleaving is performed and the group in which no interleaving is performed.

Referring to FIG. 5, the resource allocation method according to the first embodiment of the present invention informs the relay of the resources allocated for the relay in the cell in the form of a plurality of resource groups rather that a single resource group.

In the conventional resource allocation method for the relay control channel transmission as depicted in FIG. 2, the entire resource region is informed. In order to allocate the resources in a frequency selective manner in the conventional method, the base station must allocate large amounts of resources across the entire bandwidth 401 in advance. Accordingly, it is difficult to perform the frequency selective resource allocation and the frequency diversity resource allocation.

In the resource allocation method according to the present invention, the base station segments the entire resource region into a plurality of resource groups and informs the relay of the currently used resource group as shown in FIG. 5, unlike the conventional resource allocation method in which the entire resource region is dealt with as a single resource, as shown in FIG. 2.

In FIG. 5, reference numbers 519, 521, 523, and 525 denote the semi-static resource groups that are obtained by dividing the single resource. The resource groups are regions in which the Relay-PDCCH (R-PDCCH) is transmitted, and the relay attempts blind decodings to the R-PDCCH in the resource group assigned for itself, resulting in a reduction of the number of blind decodings. That is, the relay performs the blind decoding in such a manner that the relay is assigned a resource group (one of the resource groups 519, 521, 523, and 525) in advance in which its own relay control channel exists and searches for its relay control channel in the selected resource group region so as to reduce the number of blind decoding attempts. The relay can be allocated one or more resource groups.

For example, assuming that a total of 32 Physical Resource Blocks (PRBs) are indicated, if the resource is used as a single group as shown in FIG. 2, the number of blind decoding attempts is 32+16+8+4=60. In contrast, if the resource is divided into 4 groups as shown in FIG. 5 according to an embodiment of the present invention, the number of blind decoding attempts is 8+4+2+1=15. This is because the resource allocation method of the present invention allocates one small resource group per relay such that the relay searches only the allocated resource group for its control channel with blind decodings.

In order to perform blind decoding in this manner, the relay has to know the total number of resource groups and the index and size of each resource group. Accordingly, the base station informs the relay of the resource group information, i.e. the number of resource groups and index and size of each resource group by higher layer signaling. The resource group information can be transmitted in the form of the information about all of the resource groups by means of the system information or in the form of the information about the resource group allocated to each relay by means of Radio Resource Control (RRC) signaling.

Tables 1 and 2 show configurations of resource group information informed to the relay according to an embodiment of the present invention. Table 1 is a message format of system information carrying the resource information, and Table 2 shows a message format of RRC signaling carrying the resource information.

TABLE 1

```
R-PDCCH configuration{
    Semi-static resource group{
        NumberOfResourceGroup 1,...,N {
            ResourceAllocation 1,
            ResourceAllocation 2,
            ...
            ResourceAllocation N,
        }
    }
}
```

Table 1 shows the case where the resource is divided into N resource groups. The resource group information is transmitted to the relay by higher layer signaling such that the relay is notified of the number of resource groups and sizes of individual resource groups. The higher layer signaling can be done with System Information Block 2 (SIB2). In the case of using system information, the base station is needed to inform the relay of only the resource group index for the relay to use to acquire the resource configuration information in the RRC signaling. In the case where the resource group information is not transmitted in the system information, the base station has to send the information about the resource to be used by the relay in RRC signaling along with the configuration information. Table 2 shows the information per resource group when the resource group information is transmitted in RRC signaling.

TABLE 2

```
Semi-static resource group configuration{
    Semi-static resource group{
        ResourceAllocation information,
        Interleaver on/off
        CRS or DRS
        DM RS port index(if DRS is used)
    }
}
```

Figure 6:
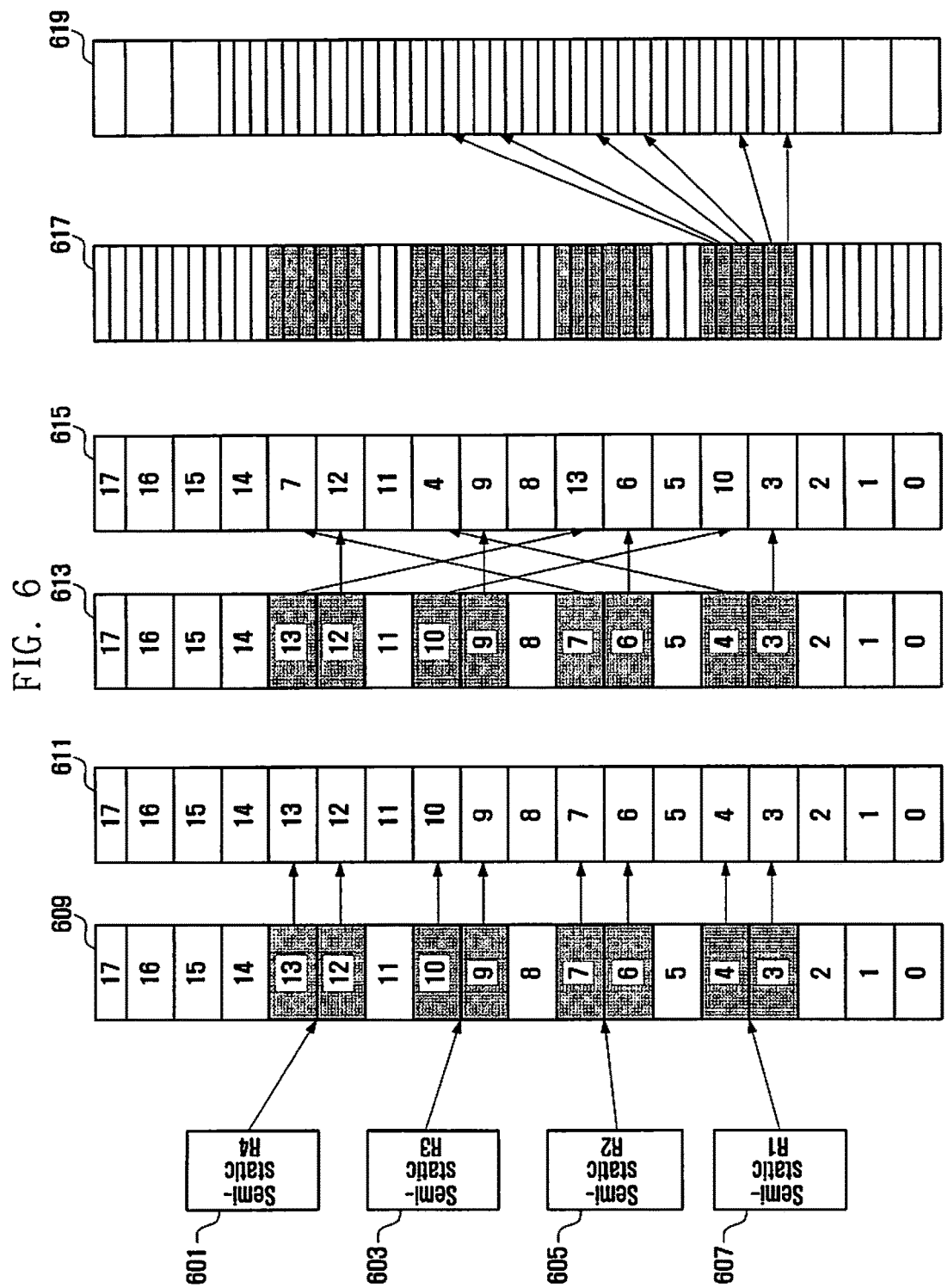
FIG. 6 is a diagram illustrating a principle of a resource allocation rule for the relay control channel resource groups according to a second embodiment of the present invention.

As shown in Table 2, the resource group information includes the resource allocation information, the information on the control channels multiplexed in the allocated resource, and the information related to the reference signal such as the type of reference signal. This is because the relays operating in the same transmission mode are allocated the same resource group and the control channels can be interleaved. The resource allocation information informs the relay of the resource region in which the relay received the information attempts control channel demodulation among the resources carrying the entire control channels. This region can be informed by a PRB index or a set of PRB. This will be further described with reference to the resource allocation method in a second embodiment as shown in FIG. 6. The relay also can check whether its control channel is multiplexed with the control channels of other relays by referencing the interleaver on/off information. If the interleaver is on, the relay starts receiving the information with the recognition that its control channel is interleaved with the control channels of other relays. Also, the relay receives the information about the type of the reference signal used for demodulating the control channel intended for itself. It is noted that all of the relays that received the same group resource information receive the control channel using the same reference signal (RS). That is, if a specific resource group is allocated to a relay, this means that the relays allocated the same resources use the same interleaving scheme and reference signal. In other words, the relays operating in the same transmission mode (whether to use interleaving and type of reference signal) are allocated the same resource group.

Figure 11:
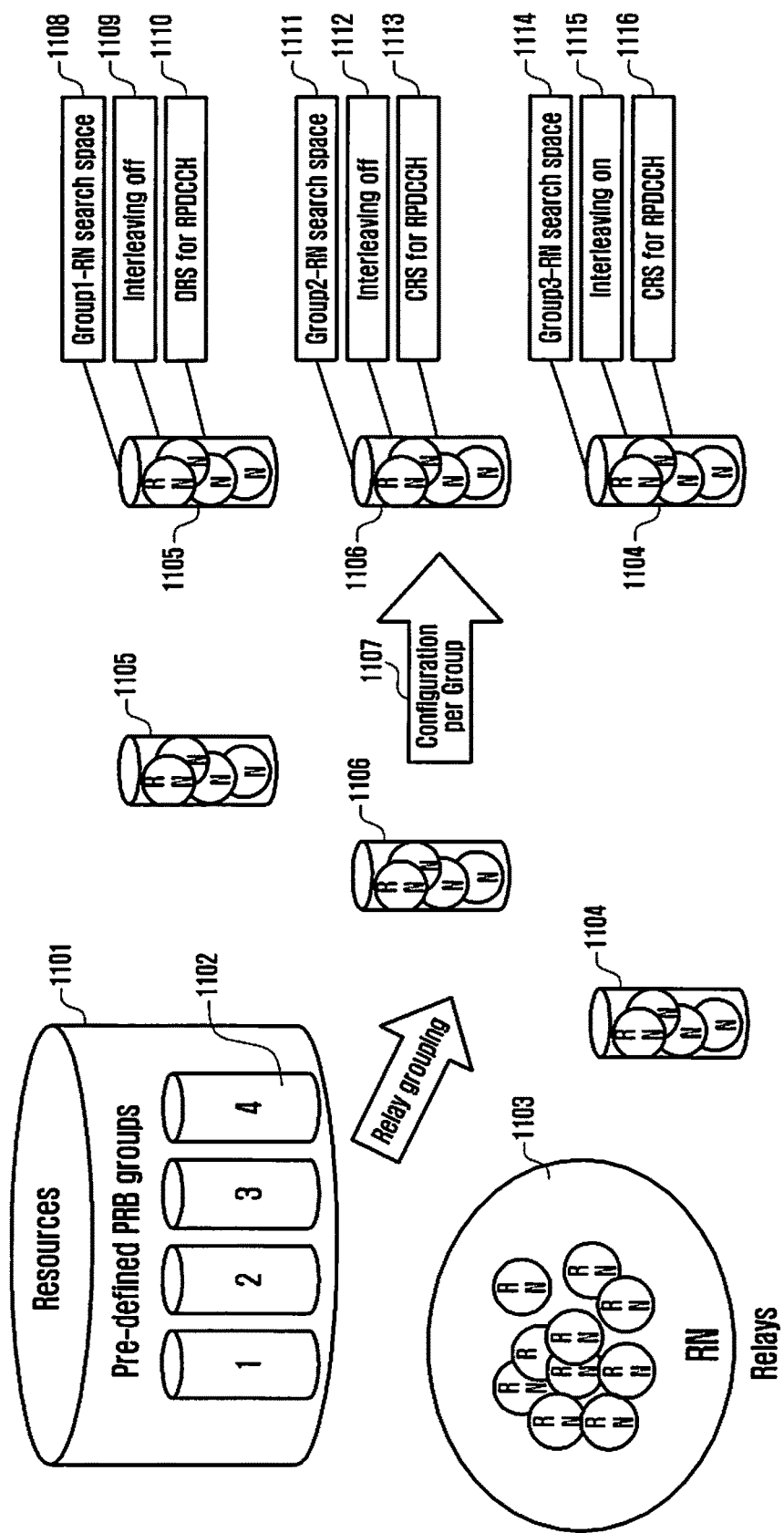
FIG. 11 is a diagram illustrating a principle of allocating control channel resource groups to the relays according to the first embodiment of the present invention.

FIG. 11 is a diagram illustrating a principle of allocating control channel resource groups to the relays according to the first embodiment of the present invention.

Referring to FIG. 11, if there is the entirely pre-configured resource as denoted by reference number 1101, the resource is divided into a plurality of resource groups as denoted by reference number 1102. At this time, the resource is divided depending on the transmission mode appropriated for individual groups determined by the base station. The relays 1103 are grouped into relay groups 1104, 1105, and 1106 in association with the resource group. At this time, a group can be composed of one or more relays, and a relay can be included in multiple groups. A relay group is formed with the relays operating in the same transmission mode.

Once the relay groups are formed, each relay group is allocated a resource group. Each relay group is allocated a search space for blind decoding in the allocated resource group. Individual search spaces are mapped to corresponding resource groups as denoted by reference numbers 1108, 1111, and 1114. At this time, the relays belonging to the same group have the same search space or respective search spaces.

Each resource group is allocated according to the transmission mode of the relay control channel. The relay allocated the resource group denoted by reference number 1105 can be configured with a Dedicated RS (DRS) as denoted by reference number 1110 without interleaving as denoted by reference number 1109. The relay allocated the resource group denoted by reference number 1106 can be configured with a Common RS (CRS) as denoted by reference number 1113 without interleaving as denoted by reference number 1112. The relay allocated the resource group denoted by reference number 1104 can be configured with CRS as denoted by reference number 1116 and with interleaving as denoted by reference number 1115. Here, the interleaving includes REG level interleaving, CCE level interleaving, and PRB level interleaving.

Second Embodiment

As described above, in the case where the resource is divided into a plurality of resource groups to be allocated for control channels of relays, the physical resources mapped to the virtual resources of groups 511, 513, 515, and 517 of FIG. 5 can be arranged across consecutive Physical Resource Blocks (PRBs) or distributed PRBs in the system bandwidth. A description is now made of the resource allocation rule for mapping virtual resources to the physical resources.

FIG. 6 is a diagram illustrating a principle of a resource allocation rule for the relay control channel resource groups according to a second embodiment of the present invention.

Reference numbers 601, 603, 605, and 607 denote resource groups for transmitting the relay control channels. Here, each resource group can be an RB or an RBG.

As aforementioned, the base station transmits the resource group information by higher layer signaling. The base station also transmits the resource allocation rule by higher layer signaling. The resource allocation rule is the rule for mapping virtual resources to physical resources.

The relay processes the signal of its relay control channel based on the resource group information received in advance. In this embodiment, when the relay performs blind decoding on the signal of the control channels, the number of blind decoding attempts is reduced significantly.

The received relay control channel includes the information on the virtual resource (one of 609, 613, and 617). This information can be the index of the virtual resource allocated to the relay. If the index of the virtual resource is acquired, the relay can recognize the actual transmission resources (611, 615, and 619) allocated to itself according to the resource allocation rule received in advance by higher layer signaling. The resource allocation rule includes individual resource allocation sub-rules as denoted by reference numbers 609 and 611, 613 and 615, and 617 and 619; these sub-rules are referred to as first, second, and third rules for simplifying the explanation.

The first rule is described with reference to the part denoted by reference numbers 609 and 611. The first rule is designed in consideration of the terminal multiplexing in the cell and resource allocation in units of RB Groups (RBGs).

According to the first rule, the actual resources allocated to the virtual resources are mapped on contiguous frequencies. This mapping scheme is efficient in the case where frequency selectivity of the relay control channels or the terminal channels is very high.

The second rule is described with reference to the part denoted by reference numbers 613 and 615. The second rule is designed in consideration of the frequency diversity and resource allocation in units of RBGs. In the case where the frequency selectivity is not high, it is advantageous to distribute the allocated resources across the entire bandwidth in view of diversity gain and inter-cell interference uniformity. In the second rule, the resources allocated in a resource group are distributed far enough in the frequency domain.

The third rule is described with reference to the part denoted by reference numbers 617 and 619. The third rule is designed in consideration of the frequency diversity, virtual resource allocation in units of RBGs, and mapping of the virtual resources to the physical resources in units of RBs. Although the virtual resources are allocated in units of RBGs as denoted by reference number 617, the virtual resources are mapped to the physical resources in the RBG in units of RBs. The third rule is robust to interference and advantageous for multiplexing scheduled data of the terminals since it can obtain higher frequency diversity gain as compared to the second rule.

The consecutive resources can be allocated to the relays that use spatial multiplexing and/or beamforming techniques in order to exploit the frequency selective characteristic. The distributed resources can be used for diversity transmission using the normal reference signal. In this manner, the system can allocate the resources in consideration of the frequency characteristic of the relay channel and reference signal or the transmission mode. By performing multiplexing (interleaving) on the control channels allocated resources in the same resource group, it is possible to guarantee the diversity of the control channels. The control channel interleaving can be performed by using a REG level interleaver as explained in the first embodiment.

The method for configuring a plurality of resource groups for resource allocation to relay nodes and signaling the resource allocation rule for mapping the resources in the individual resource group, the control channel, and the transmission mode for transmitting/receiving the resource group information has been described hereinabove. A method for reducing the number of blind decoding attempts in order to reduce the data overhead of the resource group information is described hereinafter. The resource group indicator includes the indices of the resource groups allocated to individual relays, and each relay can reduce the number of blind decoding attempts to search for its group indicator using the resource group indicator.

Third Embodiment

In a third embodiment of the present invention, a Relay Physical Control Format Indicator CHannel (R-PCFICH) is used for transmitting the resource group indicator. The R-PCFICH is transmitted in a fixed position and, if the semi-static resource group is divided as described in the first embodiment, the R-PCFICH can be transmitted at predetermined positions according to the number of the semi-static resource groups. That is, when the R-PDCCH is received in the initial connection process, there are positions to transmit the R-PCFICH in individual resource groups, and the relay performs blind decodings on the regions carrying the R-PCFICH rather than the relay control channel regions of the entire resource groups. In this manner, the relay performs demodulation on the number of resource groups that receive the R-PCFICH value. The R-PCFICH carries the index indicating the resource group including the control channel of the relay. In this manner, the relay can reduce the number of blind decoding attempts to find the resource group allocated for its relay control channel.

Fourth Embodiment

In a fourth embodiment, a common relay control channel, i.e. common R-PDCCH, is used to implement a method for indicating a dynamic resource group. In this case, the relay must receive the common R-PDCCH transmitted by the base station in addition to the relay-specific control channel. In this common control channel, the index of the resource group used in the next backhaul subframe of the corresponding relay is transmitted. Since the resource group to be used in the next backhaul subframe is recognized with receipt of the common R-PDCCH, the relay can reduce the number of blind decoding attempts.

Figure 7:
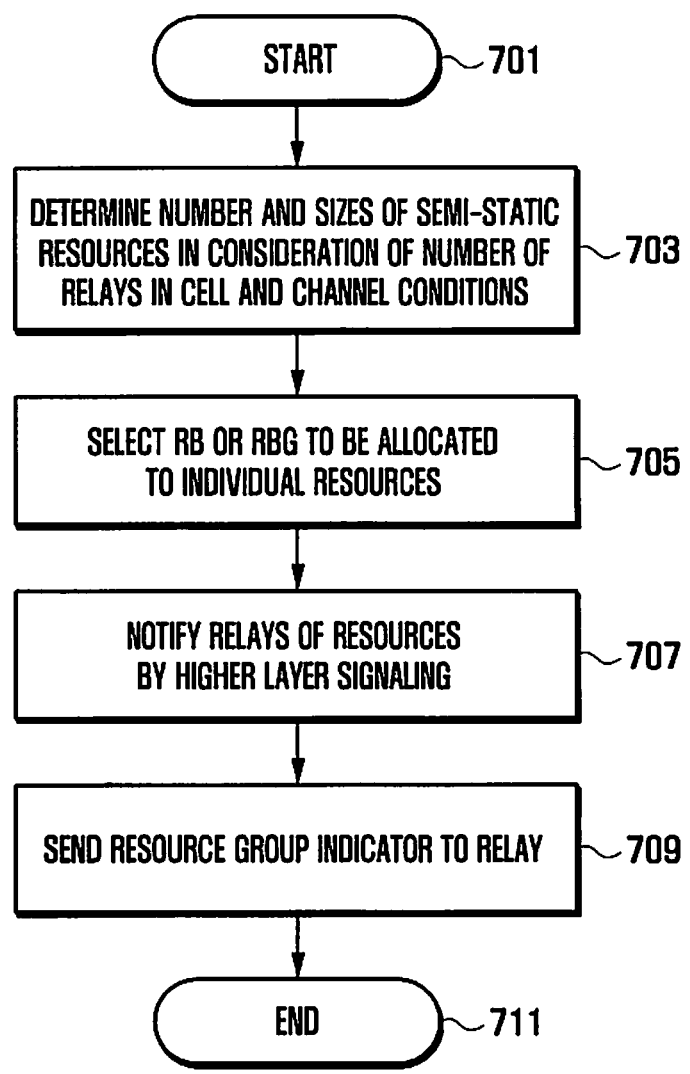
FIG. 7 is a flowchart illustrating a resource allocation information transmission method of a base station according to an embodiment of the present invention.

A description is now made of a method for a base station to transmit the resource allocation information. FIG. 7 is a flowchart illustrating a resource allocation information transmission method of a base station according to an embodiment of the present invention.

Referring to FIG. 7, the base station configures the information on the resource groups in consideration of a number of relays in the cell and the channel conditions between the base station and the relays in step 703. Next, the base station selects RBs or RBGs to be allocated in the individual semi-static resource groups in step 705. Such a selection process is performed with one of the three resource allocation rules described with reference to FIG. 6. Next, the base station transmits the resource group information, per-group resource allocation information, and control channel transmission mode information to the relays by means of higher layer signaling in step 707.

In the case of using the resource group indicator indicating the semi-static resource allocation group mapped to the resource allocated to the corresponding relay, the base station transmits the resource group indicator indicating the resource group using the current backhaul subframe in the R-PCFICH or R-PDCCH in step 709. In the case where the resource group indicator is not used, step 709 is skipped.

Here, the resource groups are updated over a long interval, and the resource group indicator is updated in every backhaul subframe.

Figure 8:
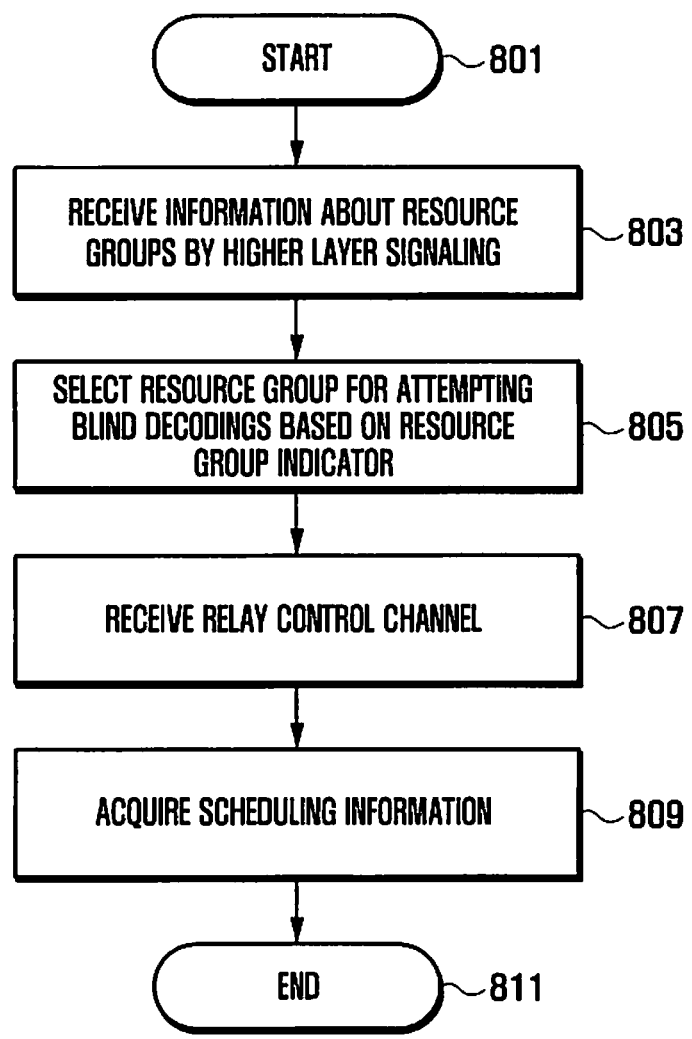
FIG. 8 is a flowchart illustrating a resource allocation information reception method of a relay according to an embodiment of the present invention.

A description is now made of a method for a relay to receive the resource allocation information. FIG. 8 is a flowchart illustrating a resource allocation information reception method of a relay according to an embodiment of the present invention.

Referring to FIG. 8, the relay receives the resource group information for transmitting the relay control channel, the resource allocation rule indicating how to map the virtual resources of the relay control channel to the physical resources, and the transmission mode of the control channel in advance by means of higher layer signaling in step 803. In step 807 the relay receives the control channel based on the resource group information and control channel transmission mode information acquired at step 803.

In the case of using the resource group indicator, the relay checks whether the current subframe is a backhaul subframe and, if so, checks the resource group indicator and selects the resource group to attempt receiving its control channel in the current subframe using the resource group indicator in step

805. The resource group indicator can be received in the R-PCFICH or common R-PDCCH.

Next, the relay performs blind decoding on the relay control channels using the resource group information or the resource group indicator in step 807. In the case of using the resource group indicator, the relay searches for the resource group indicated by the resource group indicator and finds its relay control channel by perform blind decoding in the found resource group.

Next, the relay checks whether the R-PDCCH is successfully received and, if so, acquires the scheduling information from the R-PDCCH to receive data in step 809. That is, the relay checks the virtual resource allocated to itself from its relay control channel and recognizes the physical channel actually allocated to itself according to the resource allocation rule received in advance through the virtual resource.

Figure 9:
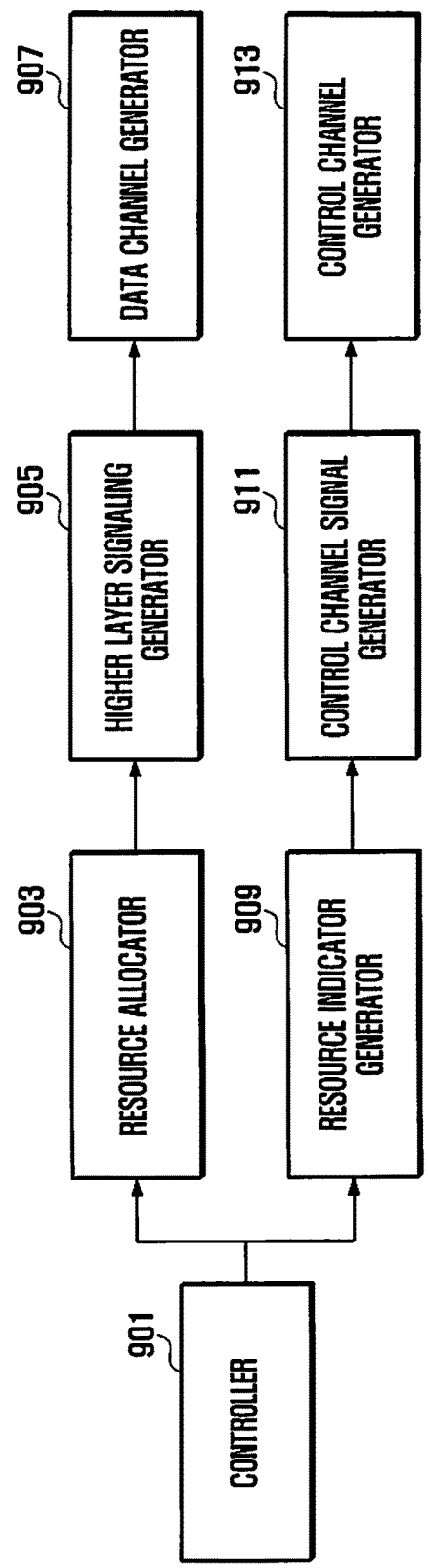
FIG. 9 is a block diagram illustrating a configuration of a base station according to an embodiment of the present invention.

A description is now made of the configuration of a base station for transmitting the resource allocation information with reference to FIG. 9. FIG. 9 is a block diagram illustrating a configuration of a base station according to an embodiment of the present invention.

As shown in FIG. 9, the base station includes a controller 901, a resource allocator 903, a higher layer signaling generator 905, a data channel generator 907, a resource indicator generator 909, a control channel signal generator 911, and a control channel generator 913.

The controller 901 performs scheduling and allocates resources to individual relays. The controller 901 also generates the resource groups to be indicated to the individual relays by grouping the relay backhaul control channels by means of the resource allocator 903. Here, the size of a resource group and the number of resource groups can vary depending on the channel conditions.

The higher layer signaling generator 905 generates information on the resource group information and control channel transmission mode in the format as described with reference to Tables 1 and 2. The higher layer signaling generator 905 also generates the information on the resource allocation rule with which the resource is allocated, whether an interleaver is used or not, and the type of reference signal used for control channel decoding.

The group resource information and transmission mode information can be transmitted through a data channel. Accordingly, the data channel generator 907 transmits the resource group information and the resource allocation rule mapped to the data channel.

When using the resource group indicator as described in the third and fourth embodiments, the controller 901 controls the resource indicator generator 909 to generate the resource group indicator using the resource group information of a specific relay as a result of scheduling in addition to the aforementioned steps.

The resource indicator generator 909 generates the resource indicator which is transmitted in one of the R-PCFICH and common R-PDCCH as described above. The control channel signal generator 911 generates the control channel signal including the resource indicator, and the control channel generator 913 maps the control channel information including the resource indicator to the control channel to be transmitted.

Figure 10:
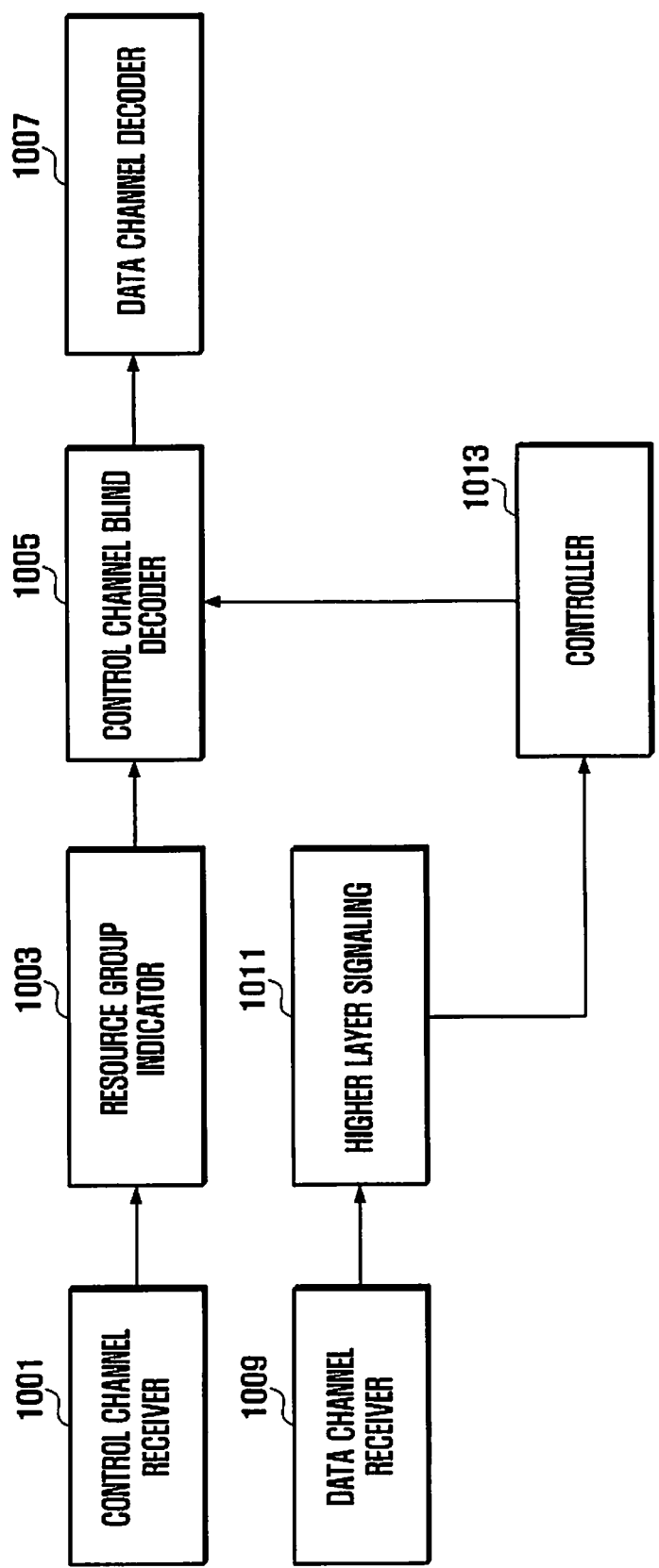
FIG. 10 is a block diagram illustrating a configuration of a relay for receiving the resource allocation information according to an embodiment of the present invention.

FIG. 10 is a block diagram illustrating a configuration of a relay for receiving the resource allocation information according to an embodiment of the present invention.

As shown in FIG. 10, the relay includes a control channel receiver 1001, a control channel blind decoder 1005, a data channel decoder 1007, a data channel receiver 1009, and a controller 1013.

The data channel receiver 1009 receives a data channel and extracts higher layer signaling 1011 from the data channel. The higher layer signaling 1011 includes allocated resource group information, resource allocation rule with which the virtual resources are mapped to the physical resources, and control channel transmission mode information. The data channel receiver 1009 also transfers the extracted resource group information and the resource allocation rule to the controller 1013.

The control channel receiver 1001 receives a channel such as the R-PCFICH and common R-PDCCH and extracts the resource group indicator 1003 from the control channel.

The resource group indicator 1003 can be selectively included. In the case where the resource group indicator is not used, the control channel blind decoder 1005 checks the resource group information provided by the controller 1013, searches for its resource group by performing blind decoding, and finds its R-PDCCH by performing blind decoding on the found resource group.

In the case where the resource group indicator is used, the control channel blind decoder 1005 checks the number of resource groups and sizes of individual resource groups using the resource group information output by the controller 1013 and finds its resource group indicated by the resource group indicator 1003. Next, the control channel blind decoder 1005 finds its relay control channel by performing blind decoding on the found resource group.

After finding its own relay control channel, the control channel blind decoder 1005 checks the position of the virtual resource allocated to relay from the found relay control channel. Next, the control channel blind decoder 1005 receives the resource allocation rule provided by the controller 1013 and checks the position of the physical resource allocated to the relay according to the resource allocation rule.

The data channel decoder 1007 checks the position of the physical resource allocated to the relay by means of the control channel blind decoder 1005 and receives the data in the corresponding position of the data channel.

The configurations of the base station and relay according to embodiments of the present invention have been described hereinabove.

As described above, in the control channel resource allocation method and apparatus for a relay node in a wireless communication system, a base station allocates a large amount of resources for the relay control channel in the form of distinctively divided resource groups such that it is possible to reduce the number of blind decodings and dynamically allocate the resources in every backhaul subframe. Also, the control channel resource allocation method and apparatus of the present invention is capable of allocating resources for transmitting data to terminals as well as the relay control channel in a frequency selective manner, resulting in improvement of entire system performance.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for configuring control channel resources of a relay by a base station, the method comprising:
   generating resource block assignment information related to resource blocks allocated to the relay and an indicator related to whether an interleaving is applied;

transmitting resource information comprising the resource block assignment information and the indicator; and transmitting control information on a control channel based on the resource information.

2. The method of claim 1, further comprising:
generating resource allocation type information related to a resource allocation type,
wherein the resource allocation type indicates one of a localized type and a distributed type.

3. The method of claim 1, further comprising:
generating a reference signal (RS) indicator related to a reference signal used for demodulation,
the resource information further comprises the RS indicator.

4. The method of claim 1,
wherein if interleaving is applied, a common reference signal (CRS) is applicable, or else one of a CRS and a demodulation reference signal (DMRS) is applicable.

5. The method of claim 1, wherein control channel resources for the relay is allocated in downlink data channel region for UE.

6. The method of claim 1, wherein control channel resources for the relay is allocated in a backhaul subframe.

7. A base station for configuring control channel resources of a relay comprising:
a generator configured to generate resource block assignment information related to resource blocks allocated to the relay and an indicator related to whether an interleaving is applied; and a transmitter configured to:
transmit resource information comprising the resource block assignment information and the indicator, and
transmit control information on a control channel based on the resource information.

8. The base station of claim 7,
wherein the generator further generates resource allocation type information related to a resource allocation type, and
wherein the resource allocation type indicates one of a localized type and a distributed type.

9. The base station of claim 7,
wherein the generator further generates a Reference Signal (RS) indicator related to a reference signal used for demodulation, and
the resource information further comprises the RS indicator.

10. The base station of claim 7,
wherein if interleaving is applied, a common reference signal (CRS) is applicable, or else one of a CRS and a demodulation reference signal (DMRS) is applicable.

11. The base station of claim 7, wherein control channel resources for the relay is allocated in downlink data channel region for UE.

12. The base station of claim 7, wherein control channel resources for the relay is allocated in a backhaul subframe.

* * * * *